Nov. 3, 1970 J. L. PUTZ 3,538,460
HIGH POWER ELECTRONICALLY TUNABLE MICROWAVE FILTER COMPOSED
OF NONRESONANT FILTER SUBUNITS IN SERIES
Filed Oct. 9, 1967 2 Sheets-Sheet 1

INVENTOR.
JOHN L. PUTZ
BY
Leon F. Herbert
ATTORNEY

INVENTOR.
JOHN L. PUTZ
BY
Leon F. Herbert
ATTORNEY

United States Patent Office 3,538,460
Patented Nov. 3, 1970

3,538,460

HIGH POWER ELECTRONICALLY TUNABLE MICROWAVE FILTER COMPOSED OF NON-RESONANT FILTER SUBUNITS IN SERIES

John L. Putz, Palo Alto, Calif., assignor to Varian Associates, Palo Alto, Calif., a corporation of California Filed Oct. 9, 1967, Ser. No. 673,596
Int. Cl. H01p *5/14*; H03j *3/18*
U.S. Cl. 333—11 7 Claims

ABSTRACT OF THE DISCLOSURE

An electronically tunable high power filter is realized without the utilization of resonant circuit elements by cascading a plurality of directional dual channel filter subunits together in a manner such that the individual periodic responses of the subunits combine to give a single narrow transmission peak at the desired frequency while the undesired or spurious peaks in the response characteristic are suppressed. By controlled shifting of the response peaks of the individual filter subunits, the pass band frequency can be electronically shifted anywhere within the filter design operating band.

Each filter subunit includes an input and output port coupled together via a pair of waveguide transmission channels having unequal electrical lengths which are coupled together at their respective ends by directional couplers. One of the individual waveguide channels in each pair is provided with means for varying the waveguide channel phase velocity to provide the filter with an electronically tunable response charactertistic within the design band of the filter.

BRIEF DESCRIPTION

Tunable high power microwave filters for utilization in microwave transmission systems such as sophisticated radars or communication links have heretofore generally included mechanically tuned resonant circuit elements which limited the rate of tuning of the filter as well as introducing complex impedance matching problems over the design band of the filter. The present invention eliminates such drawbacks via a nonresonant filter design which incorporates a plurality of cascaded filter subunits each of which has a different periodicity in its individual sinusoidal response characteristic. The individual subunits are simple two-terminal, input-output devices each characterized by the presence of a pair of transmission arms or channels having different total electrical lengths and coupled together at their respective ends by directional couplers. The individual arms of each pair have total electrical lengths which differ by specified amounts depending upon the desired desgn bandwidth of the filter and the number of subunits desired. One arm of each subunit is provided with means for changing the electrical length or phase of the arm which for high power applications and tuning speed involves an electronic mechanism distributed along the arm length which has the capability of varying the phase velocity of the arm for any frequency within the design bandwidth an amount which will introduce preferably phase shifts up to ±180°. Each arm is required to carry only one-half the total power transmitted which in itself is highly advantageous, especially for multikilowatt power levels which the filter of the present invention is capable of handling. A further advantage results from the fact that the power not delivered to the output is not reflected back to the input but is absorbed in a suitable auxilary load, resulting in a good input R.F. match at all frequencies in the design band. The indivdual filter subunits have response characteristics which can be characterized in a simple manner as periodic with frequency and sinusoidal in character by the following expression:

$$\frac{P_{out}}{P_{in}}=\frac{1}{2}\left[1+\cos 2\pi f\left(\frac{L_1}{v_1}-\frac{L_2}{v_2}\right)\right]$$

where $v_1$ and $v_2$ are the phase velocities in arms 1 and 2, respectively, and $L_1$ and $L_2$ are the total lengths of each arm as measured between the directional couplers. It is understood that in general $v_1$ and $v_2$ may vary with frequency. $P_{in}$ and $P_{out}$ are the respective powers at the input and output terminals of the subunit. The response width of a given peak is a function of the difference between $L_1$ and $L_2$ and the tuning rate of a subunit is a function of the change in phase velocity in the arm or channel provided with the phase shift means which can be termed the active arm. Thus independent control of the resultant response characteristic as well as resultant tuning rate of the filter of the present invention is achieved via the individual filter subunits. The overall or resultant response of the filter with regard to the elimination of the spurious transmission peaks within the design bandwidth of the filter and the selection of a given transmission peak as the desired operating peak is achieved by simply obtaining correspondence between the individual subunit main peaks at a given desired operating frequency and selecting the periods of the various subunits such that at all other frequencies in the operating band, at least one of the subunits has nearly zero transmission. This can be achieved by first selecting one filter subunit on the basis of the desired half power fractional frequency width of a peak which is given by $$\frac{1}{2(n_1-n_2)(1+v'/f')}$$

where $n_1$ and $n_2$ are the total number of guide wavelengths in the active and passive arms respectively as determined at the center frequency of the main or desired operating peak, and $v'$ is the fractional velocity decrease resulting from a fractional frequency increase $f'$, assuming that both arms of the subunit have similar dispersion characteristics. The selection of the first subunit $n_1-n_2$ difference on the basis of the desired half power fractional frequency width will be made on the basis of how narrow band a response characteristic is desired. The additional subunits can then be selected with appropriate $n_1-n_2$ differences which in one embodiment form a geometric progression differing by a constant factor of 2 to provide peak-zero correspondence over the electronic tunable bandwidth of the filter for all the spurious peaks of the first filter subunit. A further enhancement of the filter design of the present invention is the design of the active arms of the filter subunits such that a relatively small variation in phase velocity in each active arm will produce the desired shift in the frequency response of each subunit to place the desired main or transmission peak anywhere within the electronically tunable design band of the filter. This is accomplished by simply making $n_1$ for each subunit large and preferably equal and selecting $n_2$ for each subunit as indicated above such that the individual $n_1-n_2$ differences for all subunits form for example a geometric progression differing by a constant factor of 2.

The total number of subunits required depends upon the desired degree of suppression of the spurious peaks in the desired electronic tuning band, and will always be greater than $\log_2(R/W+1)$ where R is the design tuning range and W is the half-power width of the modes of the first filter unit.

It is therefore an object of the present invention to provide a novel electronically tunable filter for microwave energy capable of being tuned in microseconds.

A feature of the present invention is the provision of an electronically tunable microwave filter which includes a plurality of cascaded filter subunits with each filter subunit characterized by a response which is periodic and sinusoidal and which subunits include a pair of waveguide transmission arms having their respective ends coupled together by directional coupler means with the individual subunit filter response peaks interrelated such that peak zero correspondence is achieved for suprious peaks within the electronic tuning range of the filter.

These and other features and advantages of the present invention will become more apparent upon a perusal of the following specification taken in conjunction with the accompanying drawings wherein.

Figures 1, 3:
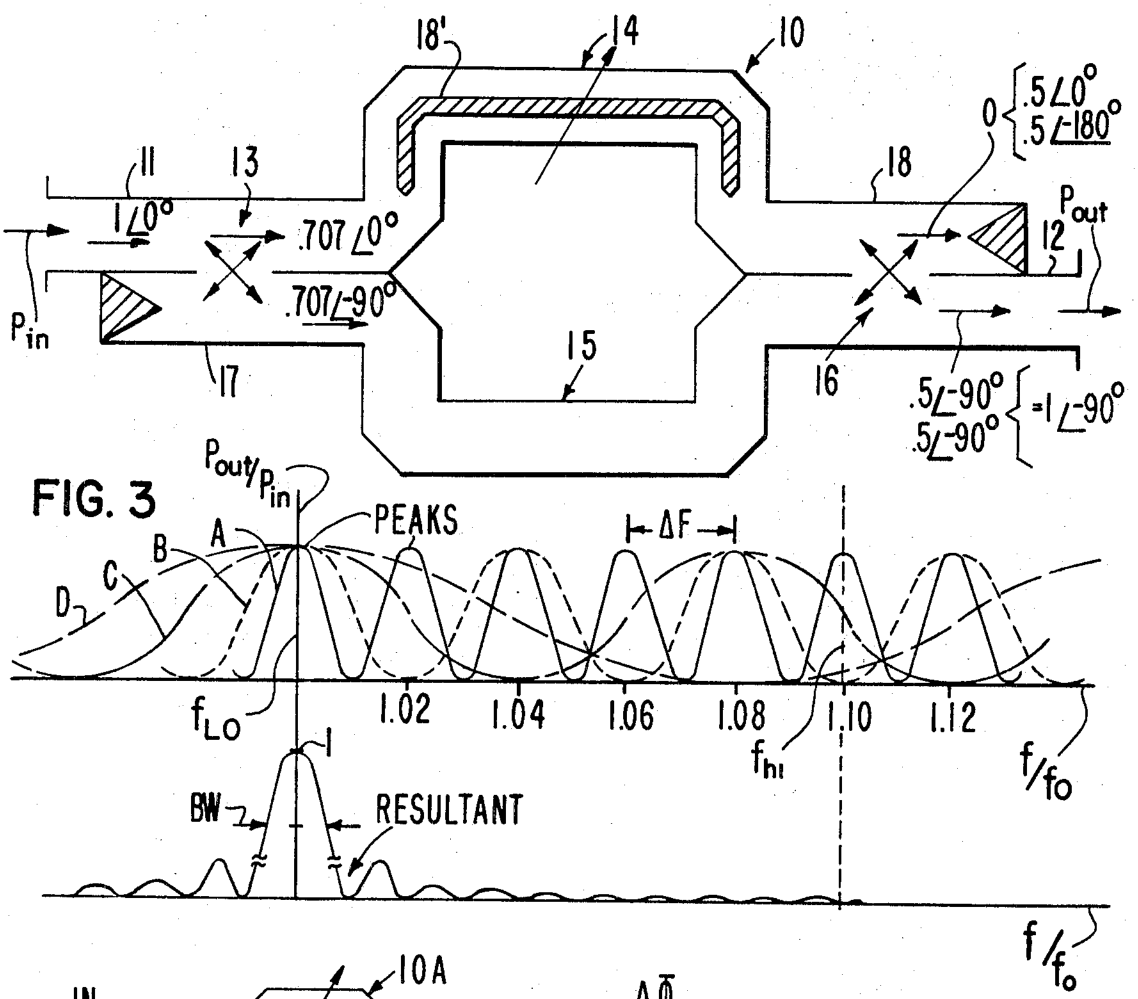
FIG. 1 is a schematic representation of a filter subunit of the electronically tunable filter of the present invention.
FIG. 3 is an illustrative graphical portrayal of the individual subunit and cascaded subunits response characteristics for a typical filter design.

Turning now to FIG. 1 there is depicted a schematic representation of a waveguide filter subunit 10 incorporating the teachings of the present invention. The subunit 10 includes an input arm or port 11 for receiving R.F. energy to be filtered and an output arm or port 12 for extracting R.F. energy from the subunit. A directional coupler 13, of the type known as a 3 db shortslot hybrid, or alternatively a "magic tee" splits the energy introduced into input arm 11 between a pair of waveguide arms or channels 14, 15 according to the E-field vector notation depicted in FIG. 1 in a manner well known in the art. The split R.F. energy is then recombined via another directional coupler 16 according to the E-field vector notation depicted therein in a manner well known in the art. The two dummy arms 17, 18 may be terminated with any well known R.F. energy absorbing means, e.g., an R.F. water-load. The vector notation holds for a given subunit having arms 14, 15 of 0° electrical lengths for a given frequency or for unequal arm lengths which are 360° multiples for a given frequency. In other words, the R.F. power introduced at input arm 11 is equally split between arms 14 and 15 and recombined with a 90° phase shift in output arm 12 at frequencies in which the electrical lengths of the arms produce 0°, 360° . . . relative phase shifts. Arm 14 is provided with a distributed type of phase shifting means 18' denoted by cross-hatched portion which is electronically variable and will be denoted as the active arm of the pair.

Figure 2:
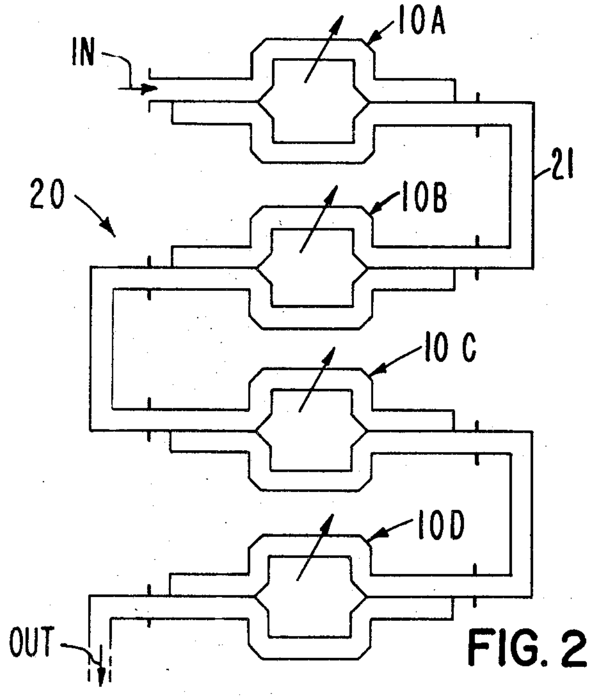
FIG. 2 is a schematic diagram of a plurality of cascaded filter subunits such as depicted in FIG. 1 forming an electronically tunable filter.

In FIG. 2 a plurality of filter subunits 10A, 10B, 10C, 10D are shown cascaded together to form an electronically tunable filter 20 according to the teachings of the present invention. The input of subunit 10B is coupled to the output of subunit 10A via any suitable waveguide 21 as shown. The other subunits are similarly connected as shown. The physical arrangement of the units can be, e.g., along a straight line or folded such that the units lie in a plurality of spaced parallel planes if space conservation is desired.

The individual subunit response characteristics as well as the overall or resultant response characteristic for a specific filter design are depicted in FIG. 3 for purposes of providing a better insight into the functional aspects of the present invention.

A given subunit will have a response characteristic which is periodic and sinusoidal and which can be expressed in simplified form as $$\frac{P_{out}}{P_{in}}=\frac{1}{2}\left[1+\cos 2\pi f\left(\frac{L_1}{v_1}-\frac{L_2}{v_2}\right)\right]$$

where $P_{out}$ and $P_{in}$ are the respective R.F. input and output powers introduced and extracted from the input and output ports at a given operating frequency $f$, and $L_1$ and $L_2$ are the physical lengths of the active and passive arms between the directional couplers and $v_1$ and $v_2$ are the phase velocities in the respective active and passive arms as determined at $f$. As shown in FIG. 3 a transmission peak will occur in a periodic fashion with frequency for any subunit. A response peak is simply a unity power transfer point in a $P_{in}/P_{out}$ vs. frequency characteristic such as depicted in FIG. 3 where the abscissa is normalized with respect to $f_0$ the center frequency of the middle peak in the electronic tunable design band of the filter.

The half-power fractional frequency width denoted $\frac{1}{2}\Delta F$ of any given peak for any given filter subunit is equal to $$\frac{1}{2(n_1-n_2)}\cdot\frac{1}{1+v'/f'}$$

where $n_1$ and $n_2$ are the number of guide wavelengths $\lambda_g$ in the active and passive arms between the directional couplers as determined at the center frequency of a given peak, and $v'$ is the fractional decrease in velocity which occurs for a fractional increase in frequency $f'$. For a simple waveguide, the factor $1+v'/f'$ is equal to the square of the ratio of the guide wavelength $\lambda_g$ to the free-space wavelength $\lambda_0$. The frequency difference between peaks is denoted $\Delta F$ in FIG. 3 for any given filter subunit, and is approximately twice the half-power width.

It is readily apparent upon examination of FIG. 3 in the light of the expression for $P_{out}/P_{in}$ given above that the greater the difference in the number of $\lambda_g$ in the respective transmission arms 14, 15 for a given filter subunit the narrower a given response peak will be and the greater the number of peaks in a given frequency band, e.g., between $f_{Lo}$ and $f_{hi}$ in the graph depicted in FIG. 3. Now if a plurality of filter subunits are cascaded together and the individual filter response characteristics designed such that for a given band of frequencies only one common transmission peak for all the individual subunits exists at a given operating frequency $f$ and peak-zero correspondence (a zero denotes frequencies where substantially all power input is absorbed in dummy loads with substantially zero power transmitted to the output arm in a given subunit) occurs for all spurious or undesired peaks in a given frequency band then a composite or resultant response such as labeled resultant in the bottom portion of FIG. 3 results.

Now this resultant response peak which we will term the main peak or operating peak can be shifted anywhere within the design frequency band, e.g., between $f_{Lo}$ and $f_{hi}$ by simple variation of the individual phase velocities in the active arms of the filter as will be explained in more detail hereinafter.

A complete expression for the transfer characteristic of a composite waveguide filter with ideal directional couplers and identical cut off frequencies in all arms is as follows:

$$\frac{P_{out}}{P_{in}}=\prod_{m=1}^{N}\frac{A_m}{2}\left\{1+B_m\cos\left[2\pi C_m\left(\frac{f^2-f_c^2}{f_0^2-f_c^2}\right)^{1/2}\right]\right\}$$

where $A_m$ and $B_m$ are loss factors given by $A_m=1-0.115$ (loss of active arm, in db)

$B_m=1-0.0066$ (loss of active arm, in db$^2$)

$C_m$=difference between the number of guide wavelengths in the active and dummy arms of the $m$th section at midband $f$=operating frequency $f_0$=midband frequency $f_c$=waveguide cutoff frequency N=number of subunits.

To adjust any given filter subunit to pass a given frequency $f$ the expression $$C_m \left(\frac{f^2-f_c^2}{f_0^2-f_c^2}\right)^{1/2}$$

is simply made equal to an integer at $f$. Similarly, by setting all the subunits to the same $f$ a resultant response such as shown in FIG. 3 is obtained.

The following expression shows the interrelationship between the filter subunit tuning rate $\Delta f$ which is defined as the change in frequency of a peak produced by the fractional velocity change $\Delta v/v_1$ in an active arm, and the mode width W.

$$\Delta f=\frac{\Delta v}{v}\cdot 2n_1W$$

where W is the half-power width of the subunit mode. It is aparent that the mode width and tuning rate can be chosen by proper selection of $n_1$ and $dv/v$.

Thus the filter designer can choose a desired response width for the resultant response main peak by first selecting the desired value of $(n_1-n_2)$ in what will be termed the basic filter subunit, e.g., $n_1$=24 and $n_2$=0. This will, using typical waveguides in their midfrequency range produce a basic passband of approximately 1%, where basic passband is defined as BPB $$BPB = \frac{\text{half power frequency band}}{\text{center frequency}} \times 100$$

It is apparent that the bandwidth of the composite filter will be somewhat smaller than the basic passband due to the presence of the subsequent subunits.

Then the filter designer can determine the desired electronic tuning range, e.g., 10%. The following expression gives the number of peaks $n_p$ for the basic subunit in any given percentage electronic tuning range R.

$$\left(\frac{R}{2\times BPB}+1\right) \geq n_p \geq \frac{R}{2\times BPB}$$

It is seen that for the above example 5 or 6 response peaks may occur in the 10% electronic tuning range. Now additional filter subunits must be added to produce peak-zero correspondence for all spurious peaks of the basic subunit to provide a resultant characteristic such as shown in FIG. 3. Of course, many combinations are available but the preferred combination will simply use as many auxiliary subunits as required to obtain peak-zero correspondence for the spurious peaks of the basic filter subunit in the design electronic tuning range of the filter. As stated previously, this is accomplished for the example above by simply adding subunits having $n_1-n_2$ differences of ½, ¼ and ⅛ of the basic subunit. For example, the additional subunits can have $n_1$ values of 12, 6 and 3 and $n_2$=0 in each case. Due to the dispersion in actual waveguide transmission lines, the above values of $n_1-n_2$ will not result in an *exact* peak-zero correspondence at all of the spurious peaks of the first subunit, but in practice sufficient suppression can be obtained.

To electronically tune the resultant peak to any $f$ in the design electronic tuning range each subunit main peak must be shifted in frequency an appropriate amount by variation of $v_1$ in the active arm. The expression $$\Delta f=\frac{\Delta v}{v}\cdot 2n_1W$$

provides the required subunit $v_1$ shifts to accomplish this.

However, a further simplification or refinement can be made, namely, selecting the $n_1$ and $n_2$ values such that the same relative range of values in $v_1$ for each filter subunit produces the required frequency shift in each subunit. This is accomplished by making $n_1$ the same for all subunits and then setting the $n_1-n_2$ values as discussed above. For the above example where the basic subunit had an $n_1$ of 24 and $n_2$ of 0 this would mean the additional subunits would all have $n_1$=24 and $n_2$ of 12, 18 and 21, respectively. This means an approximate 4% variation in $v_1$ for each unit will be sufficient to produce a frequency shift for each subunit such that the resultant peak can be located anywhere in the design electronic tuning range of 10%. In this connection it should be noted that the phase velocity in each active arm needs to be varied only enough to shift the *nearest* peak to the desired frequency, and that in order to accomplish this result, some of the shifts may actually be in an opposite sense from others.

While the foregoing presentation has been in terms of phase velocity changes in the active arms of the respective subunits, an alternative explanation in terms of the resulting phase shifts may be more helpful in understanding the tuning procedure for the composite filter. A study of the phase relationships shown in FIG. 1 shows that adding a 360-degree phase shift to the active arm of a subunit returns that unit to its original condition of transmission, and that phase shifts of less than 360 degrees will move the transmission peaks and zeros of the subunit to new frequencies. In particular, a phase shift of 180 degrees will effectively interchange peaks and zeros, a phase shift of 90 degrees will move a peak by $\Delta F/4$, etc. Since the tuning of the composite filter involves shifting the nearest peak of each subunit to the desired operating frequency, a phase shifter in each active arm capable of producing a ±180-degree phase shift is sufficient to insure tuning to any desired frequency. The advantage of choosing the value of $n_1$ to be the same for all subunits now becomes apparent, since all the phase shifters can then be identical.

Figure 5:
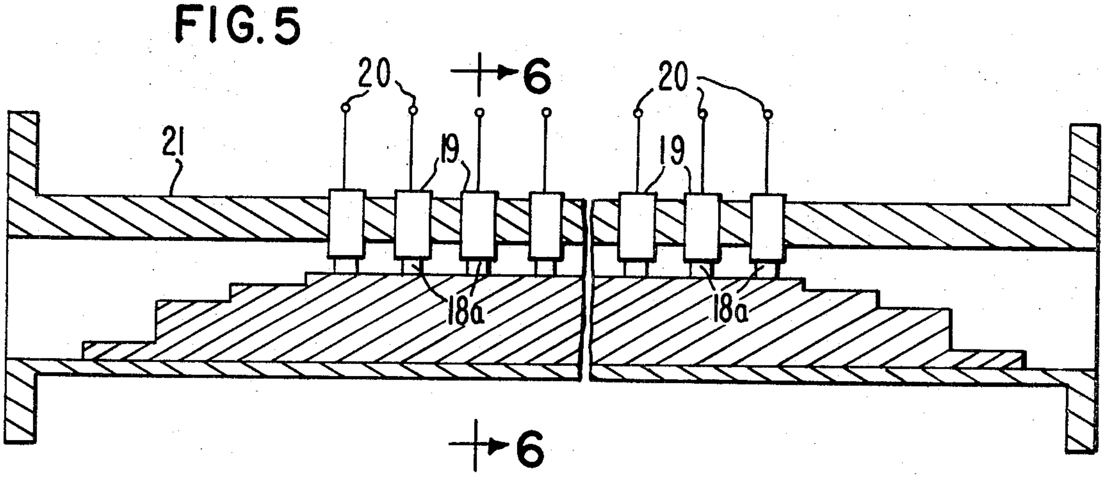
FIGS. 5–7 are views of waveguide phase shifter embodiments for the active arm portion of the filter subunits depicted in FIGS. 1 and 2.
Figure 6:
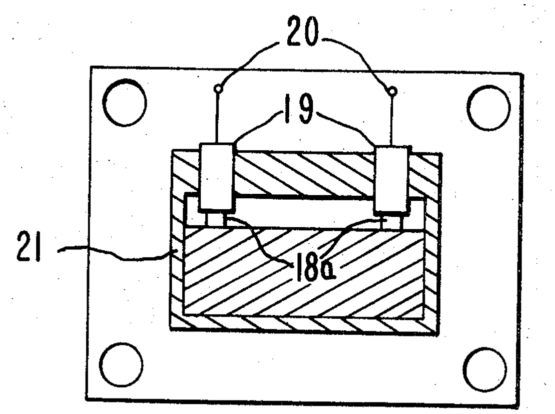

In one embodiment, a number of PIN semiconductor junction devices (hereinafter called diodes) are arranged along the sides of a reduced height waveguide in the manner shown in FIGS. 5 and 6. The diodes 18*a* are suitably mounted to include bypass arrangements 19 and bias connections 20 in a manner well known in the art. When "reverse biased" each diode and mount presents a small capacitive susceptance to the wave propagating in the guide 21, with a resulting phase shift in the electric field. When "forward biased," each diode is equivalent to a very low resistance in series with an inductance which depends on the geometry of the mount, thus producing a different phase shift from the "reverse bias" condition. By using a large number of diodes, e.g., 120 each with a small phase change e.g., 3 degrees between the forward and reverse biased states, any desired value of phase shift between 0 and 360 degrees may be obtained in steps of 3 degrees by appropriate biasing of the diodes. While not truly continuous, such tuning is sufficiently fine for most applications.

Figure 7:
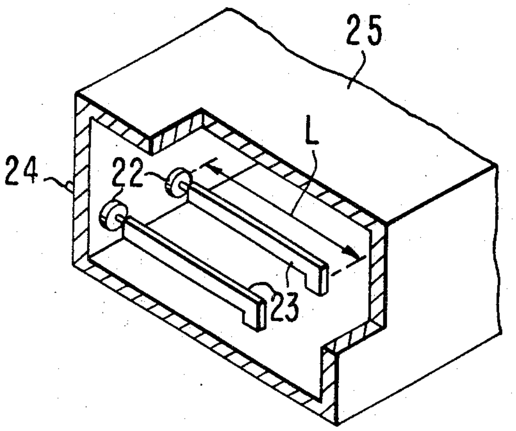

In another embodiment, the PIN diodes are used to change the resonant frequency of a bar structure which is placed in the wave guide in the manner shown in FIG. 7. In this arrangement, the diodes 22 act as switches to change the reactance at the ends of the bars 23 and thus change the resonant frequency. The switching action is implemented by application of suitable bias voltages to the bias connection 24.

Figure 4:
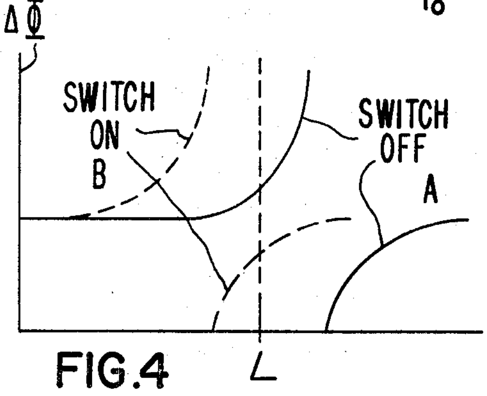
FIG. 4 is an illustrative graphical portrayal of the reactance introduced into the active arm waveguide by a particular type of phase shifting element in combination with an electronic switching element.

The resulting phase shifting action is depicted in FIG. 4 where the phase shift per bar is plotted as a function of the length of the bar for both switching conditions. By properly choosing the bar length in conjunction with the characteristics of the diode and mounting, the phase change per bar can be switched from leading to lagging by the application of bias voltage to the diode, this change being relatively independent of the operating frequency to the extent that the curves A and B of FIG. 4 are parallel. (Changing frequency is roughly equivalent to changing the length L.) Again, through the use of many bars and diodes, the overall phase shift can be changed in arbitrarily small steps.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave filter for providing a passband characteristic termed a response peak at the operating frequency $f$ of the filter within a predetermined frequency band including a plurality of filter subunits cascaded together in series to form said filter, said filter subunits having a pair of transmission arms coupled together via directional coupler means at the respective ends of the arms and R.F. input and output ports for introducing and extracting microwave energy to be filtered in each of said subunits in series sequence, each of said subunits having a response characteristic of $P_{out}/P_{in}$ vs. frequency which is periodic and sinusoidal in character and means for shifting the response peak of the filter to different frequencies within an electronic tuning range.

2. The filter defined in claim 1 wherein the filter subunits have transmission arms of unequal electrical lengths between said directional couplers and wherein one of said transmission arms of a subunit is provided with means for varying the phase velocity of said arm for microwave energy within said predetermined frequency band.

3. The filter defined in claim 1 wherein said filter subunits have their individual response characteristics interrelated such that a response peak for each subunit occurs at substantially the same frequency within said predetermined band of frequencies which corresponds to said filter response peak and wherein the periods of said individual subunits differ from each other.

4. The filter defined in claim 1 wherein the total electrical length of one transmission arm of each of said filter subunit pairs of transmission arms is substantially equal and wherein the total electrical lengths of the other arm of each of said pair of arms of said subunits are unequal in each subunit and unequal with respect to the one arm as determined at the operating frequency $f$.

5. The filter defined in claim 1 wherein the individual response characteristics of said subunits is expressed by $$\frac{P_{out}}{P_{in}}=\frac{1}{2}\left[1+\cos 2\pi f\left(\frac{L_1}{v_1}-\frac{L_2}{v_2}\right)\right]$$

where $P_{in}$ is the power introduced into the input port and $P_{out}$ is the power extracted at the output port at the operating frequency of the filter $f$, and $L_1$ and $L_2$ are the total physical lengths of the respective arms of said pair of transmission arms in each of said subunits, and $v_1$ and $v_2$ are the respective phase velocities in each of said arms as determined at $f$, said filter further characterized by having $L_1$ larger than $L_2$ in each of said subunits and said filter being further characterized by the following interrelationship between the subunits, $(n_1—n_2)$ forming a geometric progression differing by a factor of 2 for the subunits, where $n_1$=total number of electrical wavelengths in the first or active arm of a given subunit as determined at the center operating frequency $f$, and $n_2$=total number of electrical wavelengths in the other arm of a given subunit as determined at the center operating frequency $f$.

6. The filter defined in claim 1 wherein one arm of each of said subunits is provided with electronic means for varying the phase velocity of said arm to produce a given degree of phase shift in said arm for microwave energy at the operating frequency, said electronic means in the respective subunits being interrelated such that the response peak of the filter can be shifted to different frequencies within a predetermined design electronic tuning band by introducing an appropriate fractional change in $v_1$ in each of said subunits as determined by the following expression $$\Delta f=\frac{\Delta v_1}{v_1}n_1 2W$$

where $\Delta f$=change in frequency of a response peak for a given subunit $\Delta v_1/v_1$=fractional change in phase velocity in the active arm of a given subunit 2W is the half power width of the subunit $n_1$ is the total number of electrical wavelengths in the active arm of a given subunit at the midband frequency $n_2$ is the total number of electrical wavelengths in the other arm of said subunit at the midband frequency, and wherein $n_1$ is the same for all subunits and wherein the $n_1$ and $n_2$ differences for all subunits form a geometric progression differing by a factor of 2.

7. A microwave filter including a plurality of filter subunits coupled together in series cascade to produce an electronically tunable relatively narrow band response peak within a wider electron tuning band, said subunits each being characterized by providing a $P_{out}/P_{in}$ vs. frequency response characteristic which is periodic and sinusoidal, said subunits each being defined by an R.F. input waveguide and an R.F. output waveguide having a pair of waveguide transmission arms therebetween, said pair of waveguide transmission arms being coupled together at the respective end portions thereof by means of directional coupler means such that the input power is evenly divided between said pair of transmission arms at the operating frequency of said filter; said subunits having their individual response characteristics interrelated such that at least one of the individual response peaks of the subunits coincide at a single frequency within the electronic tuning band of the filter and at least some others of the individual response peaks form peak-zero correspondence for elimination of spurious peaks within said electronic tuning band.

References Cited

UNITED STATES PATENTS

| | | | |
|---|---|---|---|
| 3,050,689 | 8/1962 | Loach. | |
| 3,058,071 | 10/1962 | Walsh et al. | 333—11 |
| 3,153,208 | 10/1964 | Riblet. | |
| 3,169,225 | 2/1965 | Okwit | 333—73 X |
| 3,184,691 | 5/1965 | Marcatili et al. | 333—11 |
| 3,323,080 | 5/1967 | Schwelb et al. | 333—11 |
| 3,346,823 | 10/1967 | Maurer et al. | 333—11 |
| 3,419,823 | 12/1968 | Seidel | 333—11 |
| 3,421,118 | 1/1969 | Engelbrecht | 333—10 X |
| 3,423,688 | 1/1969 | Seidel | 333—11 X |

FOREIGN PATENTS

| | | |
|---|---|---|
| 1,283,008 | 12/1961 | France. |

OTHER REFERENCES

Marcatili and Ring: "Broadband Directional Couplers," IRE. Trans. on Microwave Theory and Techniques, MTT 10, July 1962, pp. 251–257.

HERMAN KARL SAALBACH, Primary Examiner

W. H. PUNTER, Assistant Examiner

U.S. Cl. X.R.

333—17, 73; 334—15